United States Patent
Sato et al.

(10) Patent No.: US 7,517,946 B2
(45) Date of Patent: Apr. 14, 2009

(54) PRODUCTION PROCESS OF POLY(ARYLENE SULFIDE)

(75) Inventors: Hiroyuki Sato, Fukushima (JP); Tatsuya Kawasaki, Tokyo (JP); Yasushi Nakazawa, Fukushima (JP)

(73) Assignee: Kureha Corporation, Tokyo (JP)

( * ) Notice: Subject to any disclaimer, the term of this patent is extended or adjusted under 35 U.S.C. 154(b) by 547 days.

(21) Appl. No.: 10/540,836

(22) PCT Filed: Dec. 19, 2003

(86) PCT No.: PCT/JP03/16334

§ 371 (c)(1),
(2), (4) Date: Jun. 23, 2005

(87) PCT Pub. No.: WO2004/060974

PCT Pub. Date: Jul. 22, 2004

(65) Prior Publication Data

US 2006/0089486 A1    Apr. 27, 2006

(30) Foreign Application Priority Data

Dec. 27, 2002 (JP) ............................. 2002-382249

(51) Int. Cl.
- C08G 75/16 (2006.01)
- C08G 75/00 (2006.01)
- C08G 75/02 (2006.01)
- C08G 75/04 (2006.01)

(52) U.S. Cl. .................. 528/381; 528/388; 528/500; 528/501; 528/502 R; 528/503

(58) Field of Classification Search .............. 528/381, 528/388, 500, 501, 502 R, 503
See application file for complete search history.

(56) References Cited

U.S. PATENT DOCUMENTS

| 4,645,826 A | 2/1987 | Iizuka et al. |
| 5,840,830 A | 11/1998 | Miyahara et al. |

FOREIGN PATENT DOCUMENTS

| JP | 63 243134 | 10/1988 |
| JP | 63243134 | 10/1988 |
| JP | 63 289025 | 11/1988 |

(Continued)

Primary Examiner—Duc Truong
(74) Attorney, Agent, or Firm—Porter Wright Morris & Arthur LLP (57) ABSTRACT

In the dehydration step, a mixture comprising an organic amide solvent and a sulfur source is heated, vapor volatilized is guided to a distillation column, a fraction comprising the organic amide solvent as a principal component is refluxed into a reaction vessel, a fraction comprising water and hydrogen sulfide is cooled to discharge hydrogen sulfide that is not condensed by the cooling and reflux a part of water condensed into the distillation column, the remaining water is discharged, a relational expression between the total amount of water of an amount of water refluxed and an amount of water discharged without being refluxed, and an amount of hydrogen sulfide discharged from the reaction vessel is determined in advance, and an amount of hydrogen sulfide discharged from the reaction vessel is calculated out from a measured value of the total amount of water on the basis of the relational expression to control a charged molar ratio of the sulfur source to a dihalo-aromatic compound.

8 Claims, 1 Drawing Sheet

FOREIGN PATENT DOCUMENTS

| | | |
|---|---|---|
| JP | 63289025 | 11/1988 |
| JP | 02 160833 | 6/1990 |
| JP | 02160834 | 6/1990 |
| JP | 02 185527 | 7/1990 |
| JP | 02185527 | 7/1990 |
| JP | 02 302436 | 12/1990 |
| JP | 02302436 | 12/1990 |
| JP | 05032782 | 2/1993 |
| JP | 05 086185 | 4/1993 |
| JP | 05086185 | 4/1993 |
| JP | 05 271414 | 10/1993 |
| JP | 05271414 | 10/1993 |
| JP | 07330903 | 12/1995 |
| JP | 09 272801 | 10/1997 |
| JP | 09272801 | 10/1997 |
| JP | 09286861 | 11/1997 |
| JP | 00191785 | 7/2000 |
| JP | 01 181394 | 7/2001 |
| JP | 01181394 | 7/2001 |

Fig. 1

PRODUCTION PROCESS OF POLY(ARYLENE SULFIDE)

TECHNICAL FIELD

The present invention relates to a production process of a poly(arylene sulfide), and particularly to a production process of a poly(arylene sulfide), by which a poly(arylene sulfide) having a desired melt viscosity can be stably produced.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, mechanical properties, electrical properties, dimensional stability and the like. The PASs are commonly used in a wide variety of fields such as electrical and electronic equipments and automotive equipments because they can be formed or molded into various kinds of molded or formed products, films, sheet, fibers, etc. by general melt processing techniques such as extrusion molding, injection molding and compression molding.

As a typical production process of a PAS, is known a process, in which an alkali metal sulfide that is a sulfur source is reacted with a dihalo-aromatic compound in an organic amide solvent such as N-methyl-2-pyrrolidone. As the sulfur source, a combination of an alkali metal hydrosulfide and an alkali metal hydroxide is also used.

In order to stably provide a good-quality PAS, it is necessary to strictly control polymerization conditions such as a molar ratio of an alkali metal sulfide to a dihalo-aromatic compound, a water content, a polymerization temperature and polymerization time on the premise that the purities of raw materials, secondary raw materials and the like are high and constant. For example, if a water content in the polymerization reaction system is too low, unpreferable reactions such as decomposition of a PAS formed tend to occur. If the water content is too high to the contrary, a polymerization rate is markedly slowed, or unpreferable side reactions are caused.

As the alkali metal sulfide of a raw material, is generally used its hydrate containing a great amount of water of crystallization. Further, these raw materials may be added to the reaction system as aqueous solutions in some cases. Accordingly, a great amount of water exists in the system at the point of time these raw materials have been charged into a reaction vessel. Upon the production of a PAS, thus, a dehydration step of heating and dehydrating a mixture containing an organic amide solvent and a sulfur source to control a water content in the polymerization reaction system is generally arranged as a step prior to a polymerization step.

The dehydration step is generally operated in the presence of an organic amide solvent that is a solvent for polymerization reaction and conducted until water is discharged out of the system by distillation, and the water content is lowered to generally 0.3 to 5 mol, preferably 0.5 to 2.0 mol per mol of the alkali metal sulfide. When the water content has become too low in the dehydration step, water is added prior to the polymerization reaction to regulate the water content within a desired range. After the water content is regulated, a dihalo-aromatic compound is charged into the reaction system, and the reaction system is heated, thereby conducting a polycondensation reaction.

In the dehydration step, the alkali metal sulfide reacts with water in the organic amide solvent, and hydrogen sulfide ($H_2S$) is equilibriously dissociated and volatilized out. When water is distilled off by heating in the dehydration step, the water is discharged together with the organic amide solvent outside the system, or the organic amide solvent and water are separated from each other by distillation, and only water is discharged. At the same time, hydrogen sulfide formed is also volatilized out and discharged outside the system. The volatilization of hydrogen sulfide in the dehydration step causes the following problems in an industrial production process of a PAS.

First, since the amount of a sulfur source such as an alkali metal sulfide is varied by the volatilization of hydrogen sulfide, melt viscosities of product polymers vary every lot. In general, the quality of polymers formed of every lot varies according to, for example, a change of raw materials (particularly, an alkali metal sulfide and/or an alkali metal hydrosulfide), variations in the composition of raw materials attending on changes in the grade of PAS, or variations in the amount of hydrogen sulfide volatilized out attending on changes in the rate of dehydration under heat or changes of reflux ratio in a distillation column. In addition, even when the same raw materials are used, and production is performed under substantially the same conditions, melt viscosities of polymers formed vary between lots because the amount of hydrogen sulfide volatilized out in the dehydration step varies.

Second, it is difficult to stably produce a PAS having a high polymerization degree due to volatilization of hydrogen sulfide. For example, since a way of polymerization reaction between an alkali metal sulfide and a dihalo-aromatic compound is a polycondensation reaction between 2 components, it is generally desirable to regulate a molar ratio between both components to about 1:1 with high accuracy in order to provide a PAS having a high polymerization degree. Thus, the amount of hydrogen sulfide volatilized out in the dehydration step is predicted to control the amount of a sulfur source (alkali metal sulfide and/or alkali metal hydrosulfide) charged. However, it is difficult to control an accurate molar ratio between both components upon the reaction because the range of variations in the amount of hydrogen sulfide volatilized out is wide.

If the amount of hydrogen sulfide actually volatilized out is less than the predicted amount, a molar ratio of the alkali metal sulfide to the dihalo-aromatic compound becomes excessive, and so undesirable side reactions such as rapid decomposition reaction tend to occur. In order to stably produce a PAS having a high polymerization degree, thus, it is essential to strictly control and measure the amount of hydrogen sulfide volatilized out. However, it has been difficult to achieve the intended melt viscosity and thin a scatter of melt viscosity because the amount of hydrogen sulfide volatilized out in the dehydration step varies.

Some proposals have heretofore been made for the purpose of solving the problems attending on the volatilization of hydrogen sulfide in the dehydration step. For example, there has been proposed a process comprising determining the amount of hydrogen sulfide volatilized out in a dehydration step to find an amount of a sulfur source existing the reaction system with high accuracy (for example Japanese Patent Publication No. 33775/1988). According to this process, a molar ratio of the alkali metal sulfide to the dihalo-aromatic compound in the polymerization step may be fitted with high accuracy. However, it is necessary to introduce a special dedicated device for the determination of hydrogen sulfide volatilized out in the dehydration step, and the quantitative analysis brings loss of time.

There has been proposed a process causing hydrogen sulfide volatilized out in a dehydration step to be absorbed in an aqueous solution of an alkali metal hydroxide to recycle and reuse it in a dehydration step and/or a polymerization step of the next batch (for example, Japanese Patent Application Laid-Open No. 160833/1990). When the aqueous solution of hydrogen sulfide recovered is recycled through the dehydration step of the next batch, however, this process brings high energy loss because the amount of water to be dehydrated increases. When the aqueous solution of hydrogen sulfide recovered is recycled through the polymerization step of the next batch, the process involves the problems attending on a polymerization reaction in the above-described system the water content in which is high.

There has been proposed a process comprising causing hydrogen sulfide generated in a dehydration step to be absorbed in an aqueous solution of sodium hydroxide and conducting neutralization titration with 1N hydrochloric acid to determine the amount of hydrogen sulfide volatilized out (for example, Japanese Patent Application Laid-Open No. 160834/1990). However, the process comprising collecting hydrogen sulfide in the aqueous solution of sodium hydroxide to determine it requires to introduce a dedicated device for the determination, and moreover an operation for determining is newly developed to reduce production efficiency. In addition, when the aqueous solution of sodium hydroxide containing hydrogen sulfide recovered is recycled through the reaction system, problems attending on increase in sodium hydroxide and water arise from the viewpoints of polymerization reaction and the quality of a PAS to be formed.

There has been proposed a process comprising recovering hydrogen sulfide volatilized out during a dehydration step by causing it to be absorbed in an organic amide solvent outside the system, in which the dehydration step is being conducted, and reusing the hydrogen sulfide recovered as a sulfur source in a polymerization reaction (for example, Japanese Patent Application Laid-Open No. 286861/1997). According to this process, the hydrogen sulfide volatilized out in the dehydration step can be recovered and reused, thereby solving various problems attending on the volatilization of hydrogen sulfide and producing a PAS little in variation of melt viscosity and stable in quality. However, even in this process, the amount of the volatilized hydrogen sulfide absorbed in the organic amide solvent varies, and there is a demand for developing a method for more accurately grasping the amount of hydrogen sulfide.

Among the qualities of a PAS, a melt viscosity is one of the most important qualities. It is known that a charge ratio (hereinafter abbreviated as "P/S ratio") of a dihalo-aromatic compound to an alkali metal sulfide strongly affects the melt viscosity of the PAS. However, in a production process of a PAS, comprising adding an alkali metal hydroxide as needed, and heating and polymerizing a dihalo-aromatic compound and an alkali metal sulfide and/or an alkali metal hydrosulfide in an organic amide solvent, there has not been yet proposed an industrially adoptable and excellent method for fixedly controlling the P/S ratio.

DISCLOSURE OF THE INVENTION

It is an object of the present invention to provide a production process of a poly(arylene sulfide), by which a poly (arylene sulfide) having a desired melt viscosity can be stably produced.

In particular, an object of present invention is to provide a process by which a dehydration step can be smoothly performed, an amount of hydrogen sulfide lost by volatilization out of the reaction system, or the like can be extremely accurately calculated out by a comparatively simple method, and a molar ratio of a sulfur source charged to a dihalo-aromatic compound charged is accurately controlled and set on the basis of the amount calculated out, thereby stably producing a poly(arylene sulfide) having a desired melt viscosity.

The present inventors have carried out an extensive investigation with a view toward achieving the above objects. As a result, the inventors have conceived of a method for calculating out an amount of hydrogen sulfide discharged from a reaction vessel in a production process of a PAS comprising a polymerization step of subjecting a sulfur source and a dihalo-aromatic compound to a polymerization reaction in an organic amide solvent, wherein in a dehydration step that is a step prior to the polymerization step, the dehydration step is performed by a process comprising heating the mixture in the reaction vessel, to which a distillation column is linked, guiding vapor volatilized to the distillation column to distill and separate it into respective components, refluxing a high-boiling fraction taken out of the bottom of the distillation column and comprising the organic amide solvent as a principal component into the reaction vessel, cooling a low-boiling fraction taken out of the top of the distillation column and comprising water and hydrogen sulfide on the other hand to discharge hydrogen sulfide that is not condensed by the cooling and reflux a part of water condensed into the distillation column, and discharging the remaining water, and a relational expression between the total amount of water of the amount of water refluxed into the distillation column and the amount of water discharged without being refluxed, and the amount of hydrogen sulfide discharged from the reaction vessel is determined in advance, thereby calculating out the amount of hydrogen sulfide discharged from a measured value of the total amount of water on the basis of the relational expression.

An amount (amount of the sulfur source charged) of the sulfur source remaining in the mixture after the dehydration step can be calculated out on the basis of the amount (amount of hydrogen sulfide discharged) of hydrogen sulfide calculated out by the above-described method, thereby controlling a charged molar ratio of the sulfur source to the dihalo-aromatic compound on the basis of the amount of the sulfur source calculated out. According to this method, the amount of hydrogen sulfide can be accurately calculated out without collecting hydrogen sulfide discharged to conduct quantitative analysis, thereby stably producing PASs extremely little in variation of melt viscosity every lot. The present invention has been led to completion on the basis of these findings.

According to the present invention, there is provided a process for producing a poly(arylene sulfide), comprising, after a dehydration step of heating and dehydrating a mixture containing an organic amide solvent, at least one sulfur source (A) selected from the group consisting of alkali metal hydrosulfides and alkali metal sulfides and an alkali metal hydroxide added as needed to control the amount of water in the mixture, a polymerization step of charging a dihalo-aromatic compound (B) into the system containing the remaining mixture to subject the sulfur source (A) and the dihalo-aromatic compound (B) to a polymerization reaction in the organic amide solvent, which comprises:

(1) in the dehydration step, heating the mixture containing the organic amide solvent, at least one sulfur source (A) selected from the group consisting of alkali metal hydrosulfides and alkali metal sulfides and the alkali metal hydroxide added as needed in a reaction vessel, to which a distillation column is linked, and guiding vapor volatilized to the distillation column to distill and separate it into respective components, refluxing a high-boiling fraction taken out of the bottom of the distillation column and comprising the organic amide solvent as a principal component into the reaction vessel, cooling a low-boiling fraction taken out of the top of the distillation column and comprising water and hydrogen sulfide to discharge hydrogen sulfide that is not condensed by the cooling and reflux a part of water condensed into the distillation column, discharging the remaining water, (2) determining a relational expression between the total amount of water of an amount of water refluxed into the distillation column and an amount of water discharged without being refluxed, and an amount of hydrogen sulfide discharged in advance, thereby calculating out the amount of hydrogen sulfide discharged from a measured value of the total amount of water on the basis of the relational expression, (3) calculating out an amount (hereinafter referred to as "amount of the sulfur source charged") of the sulfur source (A) remaining in the mixture after the dehydration step on the basis of the amount of hydrogen sulfide calculated out, thereby controlling a charged molar ratio of the sulfur source (A) to the dihalo-aromatic compound (B) on the basis of the amount of the sulfur source (A) calculated out, and then (4) subjecting the sulfur source (A) and the dihalo-aromatic compound (B) to the polymerization reaction in the organic amide solvent in the polymerization step.

BEST MODE FOR CARRYING OUT THE INVENTION

1. Sulfur Source:

In the present invention, at least one sulfur source selected from the group consisting of alkali metal hydrosulfides and alkali metal sulfides is used as a sulfur source. As examples of the alkali metal sulfides, may be mentioned lithium sulfide, sodium sulfide, potassium sulfide, rubidium sulfide, cesium sulfide and mixtures of two or more compounds thereof. These alkali metal sulfides are generally commercially-available and used in the form of a hydrate. Examples of the hydrate include sodium sulfide nonahydrate ($Na_2S \cdot 9H_2O$) and sodium sulfide pentahydrate ($Na_2S \cdot 5H_2O$). The alkali metal sulfide may be used as an aqueous mixture.

As a sulfur source, an alkali metal hydrosulfide may be used in combination with an alkali metal hydroxide. As examples of the alkali metal hydrosulfide, may be mentioned lithium hydrosulfide, sodium hydrosulfide, potassium hydrosulfide, rubidium hydrosulfide, cesium hydrosulfide and mixtures of two or more compounds thereof. The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous mixture (i.e., a mixture with water having fluidity) such as an aqueous solution from the viewpoints of treatment operation, metering, etc.

In general, a small amount of an alkali metal sulfide is secondarily produced in a production process of the alkali metal hydrosulfide. A small amount of the alkali metal sulfide may be contained in the alkali metal hydrosulfide used in the present invention. In this case, the total molar quantity of the alkali metal hydrosulfide and alkali metal sulfide becomes a sulfur source charged after a dehydration step.

Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred in that they are industrially available on the cheap. The alkali metal hydroxide is preferably used as an aqueous mixture such as an aqueous solution.

In the production process according to the present invention, examples of water to be dehydrated in a dehydration step includes water of hydration, a water medium of an aqueous solution and water secondarily produced by a reaction of the alkali metal hydrosulfide with the alkali metal hydroxide, or the like.

2. Dihalo-Aromatic Compound:

The dihalo-aromatic compound used in the present invention is a dihalogenated aromatic compound having 2 halogen atoms directly bonded to the aromatic ring.

Specific examples of the dihalo-aromatic compound include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide and dihalodiphenyl ketone.

Here, the halogen atom means each atom of fluorine, chlorine, bromine and iodine atoms, and 2 halogen atoms in the dihalo-aromatic compound may be the same or different from each other. These dihalo-aromatic compounds may be used either singly or in any combination thereof.

The amount of the dihalo-aromatic compound charged is generally 0.90 to 1.50 mol, preferably 0.95 to 1.20 mol, more preferably 1.00 to 1.09 mol per mol of the sulfur source (alkali metal sulfide and/or alkali metal hydrosulfide) remaining in the system after the dehydration step.

3. Molecular Weight Adjuster, Branching or Crosslinking Agent:

In order to, for example, form a terminal of a specific structure in a PAS formed or regulate a polymerization reaction or a molecular weight, a monohalo-compound (may not be always an aromatic compound) may be used in combination. In order to form a branched or crosslinked polymer, a polyhalo-compound (may not be always an aromatic compound), to which at least 3 halogen atoms are bonded, an active hydrogen-containing halogenated aromatic compound, a halogenated aromatic nitro compound or the like may also be used in combination. As the polyhalo-compound as a branching or crosslinking agent is preferred trihalobenzene.

4. Organic Amide Solvent:

In the present invention, an organic amide solvent that is an aprotic polar organic solvent is used as a solvent for a dehydration reaction and a polymerization reaction. The organic amide solvent is preferably stable to an alkali at a high temperature.

Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compound such as N-methyl-2-pyrrolidone and N-cyclohexyl-2-pyrrolidone; N,N-dialkyl-imidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkyl-pyrrolidone compounds, N-cycloalkylpyrrolidone compounds, N-alkyl-caprolactam compounds and N,N-dialkyl-imidazolidinone compounds are preferred, and N-methyl-2-pyrrolidone, N-methyl-ε-caprolactam and 1,3-dialkyl-2-imidazolidinones are particularly preferably used.

The amount of the organic amide solvent used in the polymerization reaction in the present invention is generally within a range of 0.1 to 10 kg per mol of the sulfur source.

5. Polymerization Aid:

In order to promote the polymerization reaction to obtain a PAS having a high polymerization degree in a short period of time, various kinds of polymerization aids may be used in the present invention as needed. Specific examples of the polymerization aids include metal salts of organic sulfonic acids, lithium halides, metal salts of organic carboxylic acids and alkali metal salts of phosphoric acid, which are generally publicly known as polymerization aids for PASs. Among these, metal salts of organic carboxylic acids are particularly preferred because they are cheap.

The amount of the polymerization aid used varies according to the kind of the compound used. However, it is generally within a range of 0.01 to 10 mol per mol of the sulfur source charged.

6. Dehydration Step:

The dehydration step is performed by a process comprising heating an alkali metal sulfide and/or an alkali metal hydrosulfide in an organic amide solvent in the presence of an alkali metal hydroxide as needed, desirably, under an inert gas atmosphere and discharging water outside the system by distillation. Since the alkali metal sulfide is generally used as a hydrate or aqueous mixture, it contains more water than the polymerization reaction needs. When the alkali metal hydrosulfide is used as a sulfur source, an alkali metal hydroxide of the order of an equimolar amount is added to allow the alkali metal hydrosulfide to react therewith in situ in an organic amide solvent.

In the dehydration step, the dehydration is conducted until the content of water comprising water of hydration (water of crystallization), a water medium, secondarily produced water, etc. is lowered within a range of necessary amounts. In the dehydration step, the dehydration is conducted until the water content in the polymerization reaction system is reduced to generally about 0.3 to 5 mol, preferably about 0.5 to 2 mol per mol of the sulfur source. When the water content has become too low in the dehydration step, water may be added prior to a polymerization step to regulate the water content to a desired value.

The charging of these raw materials into a reaction vessel is conducted within a temperature range of generally from ordinary temperature to 300° C., preferably from ordinary temperature to 200° C. The charging of the raw materials may not be in order, and the respective raw materials may be additionally charged in the course of the dehydration process. An organic amide solvent is used as a solvent used in the dehydration step. This solvent is preferably the same as the organic amide solvent used in the polymerization step, and N-methyl-2-pyrrolidone is particularly preferred. The amount of the organic amide solvent used is generally about 0.1 to 10 kg per mol of the sulfur source charged in the reaction vessel.

The dehydration process is conducted by heating the mixture after charging the raw materials into the reaction vessel in a temperature range of generally up to 300° C., preferably from 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system thereof. However, the batch system is preferred for the production process according to the present invention.

A reaction vessel for conducting the dehydration step may be the same as a polymerization vessel (reactor) used in the subsequent polymerization step or different from it. A material of the reaction vessel is preferably a corrosion resistant material, with a titanium material being particularly preferred. In the dehydration step, a part of the organic amide solvent is generally discharged together with water outside the reaction vessel. At that time, hydrogen sulfide is discharged (volatilized out) as a gas.

In the dehydration step, the mixture containing the organic amide solvent, at least one sulfur source selected from the group consisting of alkali metal hydrosulfides and alkali metal sulfides and the alkali metal hydroxide added as needed is heated to dehydrate it. In the production process according to the present invention, the dehydration step is performed in a reaction vessel, to which a distillation column is linked: The mixture containing the organic amide solvent, at least one sulfur source selected from the group consisting of alkali metal hydrosulfides and alkali metal sulfides and the alkali metal hydroxide added as needed is heated in this reaction vessel, and vapor volatilized is guided to the distillation column to distill and separate it into respective components. A high-boiling fraction taken out of the bottom of the distillation column and comprising the organic amide solvent as a principal component is refluxed into the reaction vessel.

On the other hand, a low-boiling fraction taken out of the top of the distillation column and comprising water and hydrogen sulfide is cooled and condensed. Hydrogen sulfide that is not condensed by the cooling is discharged. (volatilized out) as a gas. A part of water condensed by the cooling is refluxed into the distillation column, and the remaining water is discharged. The remaining water may be stored in a storage tank. In that case, the water refluxed into the distillation column is passed through, for example, a flowmeter to measure the cumulative amount thereof. Although the remaining water that is not refluxed into the distillation column is discharged, the cumulative amount thereof is also measured. When the whole amount of the remaining water is stored in the storage tank, the amount of water stored in the storage tank after the dehydration step is measured to regard it as a cumulative amount of water.

Figure 1:
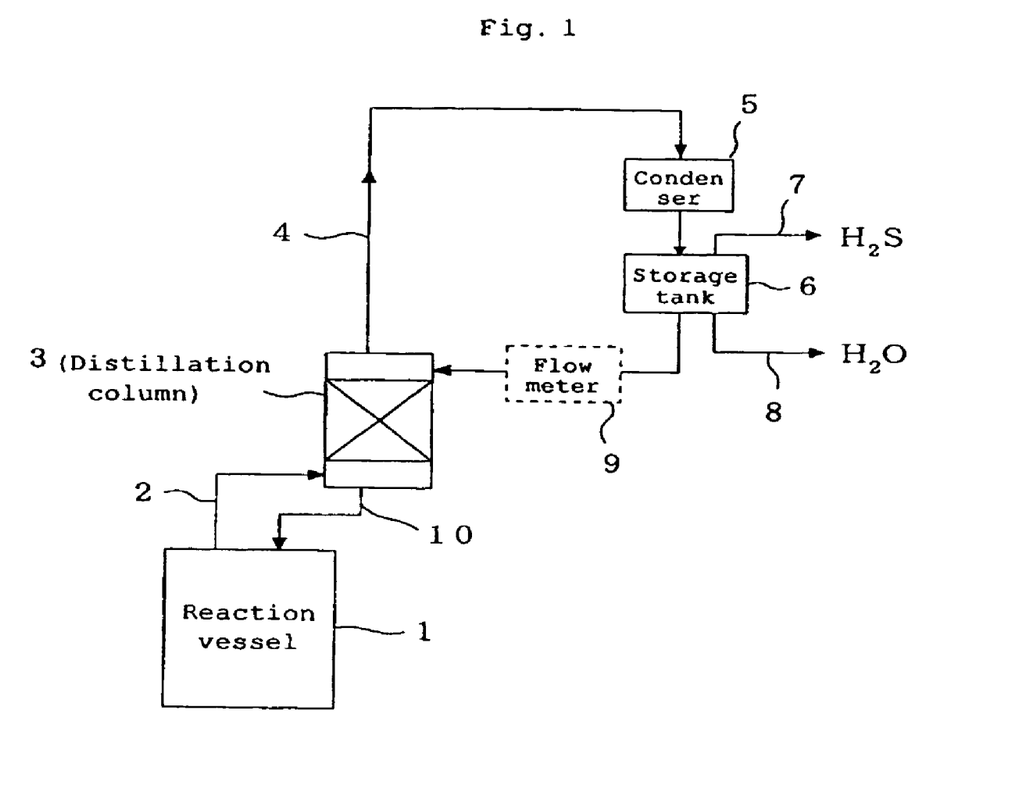
FIG. 1 illustrates an exemplary apparatus used in the production process according to the present invention.

The method according to the present invention in the dehydration step will be described more specifically with reference to FIG. 1. FIG. 1 illustrates an exemplary apparatus used in the production process according to the present invention. An upper part of a reaction vessel (for example, a polymerization vessel) 1, in which a dehydration reaction is performed, is connected to a distillation column 3 through a line 2 and successively connected to a condenser 5 and a storage tank 6 through a line 4 extending from the top of the distillation column 3. As the distillation column 3 is desirably used a high performance distillation column capable of efficiently separating an organic amide solvent such as N-methyl-2-pyrrolidone and water from each other.

A fraction comprising the organic amide solvent as a principal component is taken out of the bottom of the distillation column 3. This fraction is refluxed into the reaction vessel 1 through a line 10. A fraction containing water and hydrogen sulfide is taken out of the top of the distillation column 3. This fraction comprises water (steam) as a principal component and is also accompanied by hydrogen sulfide. The fraction from the top is guided to the condenser 5 through the line 4 and cooled. The steam is turned into water by the cooling and stored in the storage tank 6. In that case, hydrogen sulfide that is not condensed by the cooling is discharged through a line 7 as a non-condensable gas component without being stored in the storage tank. The discharge of hydrogen sulfide permits the distillation column 3 to smoothly perform distillation. The hydrogen sulfide discharged may be recovered by any method such as absorption in an organic amide solvent.

In the method according to the present invention, a part of water stored in the storage tank 6 is refluxed into the distillation column 3. In that case, an amount of water refluxed is integrated by a flowmeter 9. The refluxing of a part of water within the storage tank 6 into the distillation column 3 permits smoothly and efficiently performing separation between the organic amide solvent and water by the distillation column 3. In general, water refluxed is desirably refluxed into the top or upper part of the distillation column.

With respect to water cooled, a part thereof may be refluxed into the distillation column 3 without being stored in the storage tank 6, and the remainder may be discharged through a line 8. Alternatively, a part of water that is not refluxed into the distillation column 3 may be stored within the storage tank 6, and the remainder may be discharged through the line 8 when the capacity of the storage tank 6 is small. In any event, the amount of water refluxed into the distillation column 3 and the amount of water discharged without being refluxed are measured. After the dehydration step, water stored within the storage tank 6 may be discharged through the line 8. Incidentally, the term "discharge" as used in the present invention means discharging outside the reaction vessel and the distillation column without being refluxed into both devices.

In the dehydration step, reflux conditions are set in such a manner that a weight ratio of the amount of water refluxed into the distillation column to the amount of water discharged without being refluxed falls within a range of generally from 90:10 to 10:90, preferably from 80:20 to 20:80, more preferably from 30:70 to 70:30.

Assuming that the amount of water refluxed into the distillation column is R, the amount of water discharged without being refluxed is E, and a ratio between them is R/E, a load upon heating in the distillation column increases to cause energy loss as the ratio R/E becomes higher. If the ratio R/E is lower to the contrary, separation between the organic amide solvent and water within the distillation column becomes defective, so that a part of the organic amide solvent is distilled out together with water from the top of the distillation column and discharged, which causes problems such as loss of the organic amide solvent.

7. Calculation of Amount of Hydrogen Sulfide Volatilized:

In the present invention, an amount of water refluxed into the distillation column in the dehydration step is measured by a flowmeter, and that amount is added to an amount (generally, an amount of water stored in the storage tank) of water discharged without being refluxed. On the other hand, a relational expression between the total amount of water of the amount of water refluxed into the distillation column and the amount of water discharged without being refluxed, and the amount (also referred to as "amount of hydrogen sulfide volatilized out") of hydrogen sulfide discharged is determined in advance, and the amount of hydrogen sulfide discharged is calculated out from a measured value of the total amount of water on the basis of the relational expression.

Such a relational expression can be prepared by carrying out regression analysis using voluminous experimental data actually measured as to the relation between the total amount of water and the amount of hydrogen sulfide volatilized out in the dehydration step as a database. When the database is subjected to regression analysis, a relational expression of a linear model or non-linear model (double logarithm model or semilogarithm model) can be prepared. However, the relation between the total amount of water of the amount of water refluxed into the distillation column and the amount of water discharged without being refluxed, and the amount of hydrogen sulfide discharged can be accurately grasped by, for example, a linear model represented by the following relational expression (I):

$$y = ax + b \quad (I)$$

wherein x is the total amount (amount of distillate of water) of the amount of water refluxed into distillation column and the amount of water discharged without being refluxed in the dehydration step, y is the amount of hydrogen sulfide discharged from the reaction vessel, and both a and b are parameters. In the relational expression (I), a and b are parameters varying according to the apparatus and operating conditions a and b can be determined by subjecting the experimental data to regression analysis.

When the measured value (x) of the total amount of water is substituted into the relational expression (I), an amount (y) of hydrogen sulfide discharged in the dehydration step can be calculated out. If the amount of hydrogen sulfide discharged in the dehydration step is known, an amount of the sulfur source remaining in the reaction vessel can be calculated out from that amount and the amount of the sulfur source charged into the reaction vessel in the beginning.

In the present invention, thus, an amount (that is an actual "amount of the sulfur source charged") of the sulfur source remaining in the mixture after the dehydration step is calculated out on the basis of the amount of hydrogen sulfide calculated out to control a charged molar ratio between the sulfur source (A) and the dihalo-aromatic compound (B) on the basis of the amount of the sulfur source (A) calculated out. The charged molar ratio between the sulfur source (A) and the dihalo-aromatic compound (B) is such that the amount of the dihalo-aromatic compound amounts to generally 0.90 to 1.50 mol, preferably 0.95 to 1.20 mol, more preferably 1.00 to 1.09 mol per mol of the sulfur source (alkali metal sulfide and/or alkali metal hydrosulfide). In order to obtain a PAS little in variation of melt viscosity every lot, it is desirable to fixedly control a molar ratio of the amount of the dihalo-aromatic compound charged to 1 mol of the sulfur source within a range of 1.00 to 1.09.

8. Polymerization Step:

The polymerization step is conducted by charging a dihalo-aromatic compound into the mixture after completion of the dehydration step and heating the sulfur source and the dihalo-aromatic compound in an organic amide solvent. When a polymerization vessel different from the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water may be controlled as needed. Before the polymerization step or during the polymerization step, a polymerization aid and other additives may be mixed.

The mixing of the mixture obtained after completion of the dehydration step with the dihalo-aromatic compound is conducted within a temperature range of generally from 100 to 350° C., preferably from 120 to 330° C. When the respective components are charged into the polymerization vessel, no particular limitation is imposed on the order of charging, and both components are charged in small portions or at a time.

The polymerization reaction is conducted at generally 100 to 350° C., preferably 120 to 330° C., more preferably 170 to 290° C. As a heating method for this reaction, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours. The amount of the organic amide solvent used in the polymerization step is within a range of generally 0.1 to 10 kg, preferably 0.15 to 1 kg per mol of the charged sulfur source existing in the polymerization step. The amount may be changed in the course of the polymerization reaction so far as it falls within this range.

The content of water upon the beginning of the polymerization reaction is preferably controlled within a range of generally 0.3 to 5 mol per mol of the sulfur source charged. When it is intended to obtain a low-molecular weight polymer or oligomer, or a special polymerization process is adopted, however, the water content may be changed outside this range. For example, the water content may be controlled within a range of 0.1 to 15 mol, preferably 0.5 to 10 mol per mol of the sulfur source such as an alkali metal sulfide. The water content may be increased in the course of the polymerization reaction or decreased by distillation to the contrary.

Examples of polymerization processes comprising increasing the water content in the course of the polymerization reaction include a process comprising conducting a reaction at a temperature of 170 to 270° C., preferably 180 to 235° C. in the presence of water in an amount of 0.5 to 2.4 mol, preferably 0.5 to 2.0 mol per mol of the sulfur source charged to control a conversion of the dihalo-aromatic compound to 50 to 98 mol %, adding water so as to bring about a state that water exists in a proportion of more than 2.0 mol, but up to 10 mol, preferably 2.5 to 7.0 mol per mol of the sulfur source charged, and then heating the reaction system to a temperature of 245 to 290° C., thereby continuing the reaction.

As a particularly preferable production process, may be mentioned a process comprising conducting a polymerization reaction in the polymerization step by an at least two-stage polymerization process comprising:
(1) Step 1 of heating a reaction mixture containing the organic amide solvent, the sulfur source (A) and the dihalo-aromatic compound (B) to 170 to 270° C. in the presence of water in an amount of 0.5 to 2.0 mol per mol of the sulfur source (A) charged to conduct a polymerization reaction, thereby forming a prepolymer that a conversion of the dihalo-aromatic compound is 50 to 98%, and
(2) Step 2 of controlling the amount of water in the reaction system so as to bring about a state that water exists in a proportion of more than 2.0 mol, but up to 10 mol per mol of the sulfur source (A) charged, and heating the reaction system to 245 to 290° C., thereby continuing the polymerization reaction.

In Step 1, it is desirable to form a prepolymer having a melt viscosity of 0.5 to 30 Pa·s as measured at a temperature of 310° C. and a shear rate of 1,216 sec$^{-1}$. In Step 2, the polymerization reaction is continued so as to form a polymer having a melt viscosity higher than the melt viscosity of the prepolymer formed in Step 1.

Water may be added at a final stage of the polymerization reaction or upon completion thereof to increase the water content for the purpose of lowering the contents of common salt secondarily produced and impurities in the polymer formed or collecting the polymer in the form of particles. To the polymerization step according to the present invention, may be applied many of other publicly known polymerization processes or modified processes thereof, and the present invention is particularly not limited to a particular polymerization process. The polymerization reaction system may be a batch system, a continuous system or a combination of both systems. In the batch-wise polymerization, 2 or more reaction vessels may be used for the purpose of shortening the polymerization cycle time.

In the production process according to the present invention, a post treatment after the polymerization reaction may be conducted in accordance with a method known per se in the art. For example, after completion of the polymerization reaction, a product slurry cooled is separated by filtration as it is or after diluted with water or the like, and the resulting filter cake is washed and filtered repeatedly, and then dried, whereby a PAS can be collected. The product slurry may be subjected to sieving as it is in a high-temperature state, thereby collecting the polymer. After the separation by filtration or sieving, the PAS may be washed with the same organic amide solvent as the polymerization solvent, an organic solvent such as a ketone (for example, acetone) or an alcohol (for example, methanol), hot water, or the like. The PAS formed may also be treated with an acid or a salt such as ammonium chloride.

No particular limitation is imposed on the melt viscosity (as measured at a temperature of 310° C. and a shear rate of 1,216 sec$^{-1}$) of the PAS according to the present invention. However, it is preferably within a range of 30 to 800 Pa·s, more preferably 40 to 500 Pa·s. When the polymerization reaction is conducted by 2 stages, a PAS having a melt viscosity exceeding the melt viscosity of a prepolymer formed in the first-stage step (Step 1) is obtained in the second-stage step (Step 2).

The PASs obtained by the production process according to the present invention may be molded or formed into various injection-molded products or extruded products such as sheets, films, fibers and pipes either singly or by incorporating various kinds of inorganic fillers, fibrous fillers and/or various kinds of synthetic resins, if desired, as it is or after oxidized and crosslinked. Since the PASs obtained by the process according to the present invention are little in lot-to-lot variation of melt viscosity, the processing thereof can be stably conducted, and the resulting formed or molded products are provided as high-quality products little in variations of various properties. The PAS is particularly preferably poly (phenylene sulfide) (PPS).

EXAMPLES

The present invention will hereinafter be described more specifically by the following Examples and Comparative Examples. Measuring methods of physical properties are as follows.

(1) Melt Viscosity:

A melt viscosity was measured by means of Capirograph 1-C (manufactured by Toyo Seiki Seisakusho, Ltd.) using 20 g of a dry polymer as a sample. At this time, a flat die of 1 mm in diameter×10 mm in length was used as a capillary, and the temperature was set to 310° C. After the sample was placed in a measuring oven and held for 5 minutes, the melt viscosity was measured at a shear rate of 1,216 sec$^{-1}$.

Example 1

1. Dehydration Step:

An equipment shown in FIG. 1 was used to conduct a dehydration reaction as a step prior to a polymerization step. After 1,275 kg of N-methyl-2-pyrrolidone (hereinafter abbreviated as "NMP") was charged into a reaction vessel and heated to 150° C., 302 kg (3.45 kmol in terms of NaSH) of sodium hydrosulfide having a concentration of 64% by weight and 179 kg (3.36 kmol in terms of NaOH) of sodium hydroxide having a concentration of 75% by weight were charged, and heating was conducted until the temperature within the reaction vessel reached 192° C. to conduct a dehydration reaction.

After the dehydration reaction, 120 kg of water was taken out into a storage tank 6. An amount of water refluxed into a distillation column 3 during the dehydration reaction was integrated at 130 kg by a flowmeter 9, and a total amount (hereinafter referred to as "amount of distillate of water") of water passed through the distillation column 3 putting 120 kg of water stored within the storage tank 6 together was calculated at 250 kg.

From a database obtained by conducting the dehydration reaction repeatedly many times, it is proven that a linear relation represented by the following relational expression (I):

$$y = ax + b \quad (I)$$

wherein both a and b are parameters, exists between an amount (y kg) of hydrogen sulfide lost by being volatilized outside the reaction system and the amount (x kg) of distillate of water upon the distillation in the dehydration step by the distillation. Although a and b are parameters varying according to the apparatus and operating conditions, a was 0.0119, and b was −0.783 under the above-described experimental conditions.

When the amount of distillate of water was 250 kg, the amount of hydrogen sulfide volatilized out was calculated out at 2.2 kg (0.06 kmol) from this relational expression (I). This value was used to calculate out an amount of the sulfur source remaining in the reaction vessel and was found to be 3.38 kmol.

A trap composed of a 10% aqueous solution of NaOH was arranged in a line 7 in FIG. 1 to determine an amount of hydrogen sulfide in the trap and storage tank 6 by means of iodimetry so as to measure an S content lost. As a result, a value corresponding to 0.06 kmol was obtained and agreed with the value calculated out by the method according to the present invention.

2. Polymerization Step:

This reaction vessel was charged with 503 kg (3.42 kmol) of p-dichlorobenzene (hereinafter abbreviated as "pDCB") to control a molar ratio of PDCB to the sulfur source that is a monomer ratio to 1.012. The mixture within the reaction vessel was then heated up to 220° C. to conduct a reaction for 5 hours. The reaction vessel was then charged with 69 kg of water, and the reaction mixture was heated up to 260° C. to conduct a reaction for 5 hours.

After completion of the reaction, the reaction mixture was cooled near to room temperature and sifted through a screen having a sieve opening of 150 μm (100 mesh) to collect a granular polymer formed. The granular polymer was washed twice with acetone and additionally 3 times with water to obtain a washed polymer. This washed polymer was immersed in a 0.6% by weight aqueous solution of acetic acid to subject the polymer to an acid treatment. The thus-treated granular polymer was then washed twice with water. The granular polymer was dried to obtain a poly(phenylene sulfide) having a melt viscosity of 140 Pa·s. The results are shown in Table 1.

Examples 2 to 10

A dehydration step was performed by the same apparatus and conditions as in Example 1 except that the amount of distillate of water was varied within a range of 250 to 350 kg by changing the reflux ratio in the distillation column or changing the quantity of heating in the reaction vessel. After the dehydration step, an amount of distillate of water in each case was substituted into the relational expression (I) to calculate out an amount of hydrogen sulfide volatilized out, and an amount of the sulfur source remaining in the reaction vessel was calculated out on the basis of that value. The reaction vessel was charged with pDCB so as to give the same charged monomer ratio as in Example 1 on the basis of the amount of the sulfur source calculated out to perform the polymerization reaction and post treatment. Examples 2 to 10 were experimental examples for confirming the effectiveness of the process according to the present invention in the case where the amount of distillate of water was set to about 300 kg. As the result of 10 experiments in total including Example 1, the melt viscosities of the PPSs obtained were 124 Pa·s at the minimum, 155 Pa·s at the maximum and 138 Pa·s (standard deviation: 9.7) on the average. The results are shown in Table 1.

Example 11

A dehydration step was performed by the same apparatus and conditions as in Example 1 except that the amount of distillate of water was changed to 500 kg. From the general expression (I), an amount of hydrogen sulfide volatilized out was calculated out at 5.2 kg (0.15 kmol) when the amount of distillate of water was 500 kg. An amount of the sulfur source remaining in the reaction vessel was calculated out at 3.30 kmol from this value. The reaction vessel was charged with 490 kg (3.34 kmol) of pDCB so as to give the same charged monomer ratio as in Example 1 to perform the polymerization reaction and post treatment. As a result, PPS having a melt viscosity of 139 Pa·s was obtained.

Example 12

A dehydration step was performed by the same apparatus and conditions as in Example 1 except that the amount of distillate of water was changed to 600 kg. From the general expression (I), an amount of hydrogen sulfide volatilized out was calculated out at 6.4 kg (0.19 kmol) when the amount of distillate of water was 600 kg. An amount of the sulfur source remaining in the reaction vessel was calculated out at 3.26 kmol from this value. The reaction vessel was charged with 485 kg (3.30 kmol) of PDCB so as to give the same charged monomer ratio as in Example 1 to perform the polymerization reaction and post treatment. As a result, PPS having a melt viscosity of 142 Pa·s was obtained. The results are shown in Table 1.

TABLE 1

|  | Amount of sulfur source charged (kmol) | Method of calculating S content lost | Amount of distillate of water (kg) | S content lost upon dehydration step (kmol) (H$_2$S) | Amount of pDCB charged (kmol) | Monomer ratio upon polymerization (pDCB/S; mol/mol) | Melt viscosity of PPS (Pa · s) |
|---|---|---|---|---|---|---|---|
| Ex. 1 | 3.45 | Expression (I) | 250 | 0.06 | 3.42 | 1.012 | 140 |
| Ex. 2 | 3.45 | Expression (I) | 330 | 0.09 | 3.40 | 1.012 | 131 |
| Ex. 3 | 3.45 | Expression (I) | 290 | 0.08 | 3.41 | 1.012 | 137 |
| Ex. 4 | 3.45 | Expression (I) | 260 | 0.07 | 3.42 | 1.012 | 128 |
| Ex. 5 | 3.45 | Expression (I) | 350 | 0.10 | 3.39 | 1.012 | 141 |
| Ex. 6 | 3.4 | Expression (I) | 300 | 0.08 | 3.41 | 1.012 | 135 |
| Ex. 7 | 3.45 | Expression (I) | 320 | 0.09 | 3.40 | 1.012 | 124 |
| Ex. 8 | 3.45 | Expression (I) | 250 | 0.06 | 3.42 | 1.012 | 133 |
| Ex. 9 | 3.45 | Expression (I) | 340 | 0.10 | 3.39 | 1.012 | 155 |
| Ex. 10 | 3.45 | Expression (I) | 270 | 0.07 | 3.42 | 1.012 | 151 |
| Ex. 11 | 3.45 | Expression (I) | 500 | 0.15 | 3.34 | 1.012 | 139 |
| Ex. 12 | 3.45 | Expression (I) | 600 | 0.19 | 3.30 | 1.012 | 142 |

Comparative Examples 1 to 10

In Examples, the sulfur content lost (hereinafter abbreviated as "S content lost") was calculated out from the amount of distillate of water in the dehydration step, whereas in Comparative Examples 1 to 10, the amount of distillate of water was not investigated, and the amount of PDCB charged was determined on the basis of the S content lost that had been calculated out in Example 1 to conduct a polymerization reaction. In other words, the same equipment as in Examples 1 to 10 was used to conduct a dehydration reaction, a polymerization reaction and a post treatment.

After 1,275 kg of NMP was charged into a reaction vessel and heated to 150° C., 302 kg (3.45 kmol in terms of NaSH) of sodium hydrosulfide having a concentration of 64% by weight and 179 kg (3.36 kmol) of sodium hydroxide having a concentration of 75% by weight were charged, and heating was conducted until the temperature within the reaction vessel reached 192° C. to conduct a dehydration reaction. Assuming that the amount of hydrogen sulfide volatilized out in the dehydration step is 2.2 kg (0.06 kmol) like that calculated out in Example 1, an amount of the sulfur source remaining in the reaction vessel was calculated out at 3.38 kmol using this value. The reaction vessel was charged with 503 kg (3.42 kmol) of pDCB on the basis of the amount of the sulfur source thus calculated out to control a molar ratio of pDCB to the sulfur source that is a monomer ratio to 1.012.

The mixture within the reaction vessel was heated up to 220° C. to conduct a reaction for 5 hours, the reaction vessel was then charged with 69 kg of water, and the reaction mixture was heated up to 260° C. to conduct a reaction for 5 hours. After completion of the reaction, the reaction mixture was cooled near to room temperature and sifted through a screen having a sieve opening of 150 μm (100 mesh) to collect a granular polymer. The granular polymer was washed twice with acetone and additionally 3 times with water to obtain a washed polymer. This washed polymer was immersed in a 0.6% by weight aqueous solution of acetic acid, washed additionally twice with water and then dried.

The melt viscosities of the respective polymers obtained by 10 experiments (Comparative Examples 1 to 10) in total were 75 Pa·s at the minimum, 151 Pa·s at the maximum and 105 Pa·s (standard deviation: 22.6) on the average, so that a scatter of melt viscosity was extremely wide. The results are shown in Table 2.

Comparative Example 11

The calculation of the S content lost from the amount of distillate of water in the dehydration step according to the present invention was not conducted, and a trap composed of a 10% aqueous solution of NaOH was arranged in the line 7 in FIG. 1 to determine an amount of hydrogen sulfide in the trap and storage tank 6 by means of iodimetry so as to determine an S content lost.

After 1,275 kg of NMP was charged into a reaction vessel and heated to 150° C., 302 kg (3.45 kmol in terms of NaSH) of sodium hydrosulfide having a concentration of 64% by weight and 179 kg (3.36 kmol) of sodium hydroxide having a concentration of 75% by weight were charged, and heating was conducted until the temperature within the reaction vessel reached 192° C. to conduct a dehydration reaction. After the dehydration reaction, iodimetric analysis was conducted on the collection solution. As a result, an amount of hydrogen sulfide volatilized out was determined at 0.10 kmol. From this value, an amount of the sulfur source remaining in the reaction vessel was calculated out at 3.35 kmol. The reaction vessel was charged with 498 kg (3.39 kmol) of pDCB on the basis of this amount of the sulfur source to control a molar ratio of pDCB to the sulfur source that is a monomer ratio to 1.012.

The mixture within the reaction vessel was heated up to 220° C. to conduct a reaction for 1 hour, and then heated up to 230° C. over 30 minutes to conduct the reaction additionally for 1.5 hours. The reaction vessel was then charged with 69 kg of water, and the reaction mixture was heated up to 260° C. to conduct a reaction for 5 hours. After completion of the reaction, the reaction mixture was cooled near to room temperature and sifted through a screen having a sieve opening of 150 μm (100 mesh) to collect a granular polymer. The granular polymer was washed twice with acetone and additionally 3 times with water to obtain a washed polymer. This washed polymer was immersed in a 0.6% by weight aqueous solution of acetic acid, washed additionally twice with water and then dried. The melt viscosity of the PPS obtained was 142 Pa·s. The results are shown in Table 2.

TABLE 2

| | Amount of sulfur source charged (kmol) | Method of calculating S content lost | Amount of distillate of water (kg) | S content lost upon dehydration step (kmol) | Amount of pDCB charged (kmol) | Monomer ratio upon polymerization (pDCB/S; mol/mol) | Melt viscosity of PPS (Pa·s) |
|---|---|---|---|---|---|---|---|
| Comp. Ex. 1 | 3.45 | Calculated at a fixed value | — | 0.06 (assumed value) | 3.42 | — | 122 |
| Comp. Ex. 2 | 3.45 | Calculated at a fixed value | — | 0.06 (assumed value) | 3.42 | — | 88 |
| Comp. Ex. 3 | 3.45 | Calculated at a fixed value | — | 0.06 (assumed value) | 3.42 | — | 105 |
| Comp. Ex. 4 | 3.45 | Calculated at a fixed value | — | 0.06 (assumed value) | 3.42 | — | 93 |
| Comp. Ex. 5 | 3.45 | Calculated at a fixed value | — | 0.06 (assumed value) | 3.42 | — | 121 |
| Comp. Ex. 6 | 3.4 | Calculated at a fixed value | — | 0.06 (assumed value) | 3.42 | — | 151 |
| Comp. Ex. 7 | 3.45 | Calculated at a fixed value | — | 0.06 (assumed value) | 3.42 | — | 82 |
| Comp. Ex. 8 | 3.45 | Calculated at a fixed value | — | 0.06 (assumed value) | 3.42 | — | 102 |
| Comp. Ex. 9 | 3.45 | Calculated at a fixed value | — | 0.06 (assumed value) | 3.42 | — | 112 |
| Comp. Ex. 10 | 3.45 | Calculated at a fixed value | — | 0.06 (assumed value) | 3.42 | — | 75 |
| Comp. Ex. 11 | 3.45 | Analysis | — | 0.10 (analyzed value) | 3.39 | 1.012 | 142 |

INDUSTRIAL APPLICABILITY

According to the present invention, in the production process of a poly(arylene sulfide) comprising the polymerization step of subjecting a sulfur source and a dihalo-aromatic compound to a polymerization reaction in an organic amide solvent, a dehydration step that is a prior step can be smoothly performed, and a molar ratio of the sulfur source charged to the dihalo-aromatic compound charged can be accurately set on the basis of the relational expression between an amount of hydrogen sulfide volatilized out of the reaction system and lost and an amount of distillate of water upon distillation, thereby stably producing a poly(arylene sulfide) having a desired melt viscosity.

The invention claimed is:

1. A process for producing a poly(arylene sulfide), comprising, after a dehydration step of heating and dehydrating a mixture containing an organic amide solvent, at least one sulfur source (A) selected from the group consisting of alkali metal hydrosulfides and alkali metal sulfides, and an alkali metal hydroxide added as needed to control the amount of water in the mixture, a polymerization step of charging a dihalo-aromatic compound (B) into the system containing the remaining mixture to subject the sulfur source (A) and the dihalo-aromatic compound (B) to a polymerization reaction in the organic amide solvent, which comprises:

(1) in the dehydration step, (i) heating the mixture containing the organic amide solvent, at least one sulfur source (A) selected from the group consisting of alkali metal hydrosulfides and alkali metal sulfides, and the alkali metal hydroxide added as needed in a reaction vessel, to which a distillation column is linked, and guiding volatilized vapor to the distillation column to distill and separate it into respective components, (ii) refluxing a fraction taken out of the bottom of the distillation column and comprising the organic amide solvent as a principal component into the reaction vessel, (iii) cooling a fraction taken out of the top of the distillation column and comprising water and hydrogen sulfide to discharge hydrogen sulfide that is not condensed by the cooling and reflux a part of water condensed into the distillation column, and (iv) discharging the remaining water, wherein a weight ratio of an amount of water refluxed into the distillation column in step (iii) to an amount of water discharged without being refluxed in step (iv) is within a range of from 90:10 to 10:90, (2) calculating an amount of hydrogen sulfide discharged from the reaction vessel on the basis of a relational expression between the total of the amount of water refluxed into the distillation column in step (1)(iii) and the amount of water discharged without being refluxed in step (1)(iv), and the amount of hydrogen sulfide discharged from the reaction vessel, wherein the relational expression is predetermined by regression analysis using experimental data actually measured as to the relation between the total amount of water and the amount of hydrogen sulfide volatilized out in the dehydration step as a database, (3) calculating an amount (hereinafter referred to as "amount of the sulfur source charged") of the sulfur source (A) remaining in the mixture after the dehydration step on the basis of the calculated amount of discharged hydrogen sulfide and controlling a charged molar ratio of the sulfur source (A) to the dihalo-aromatic compound (B) on the basis of the amount of the sulfur source (A) calculated, and then (4) subjecting the sulfur source (A) and the dihalo-aromatic compound (B) to the polymerization reaction in the organic amide solvent in the polymerization step.

2. The production process according to claim 1, wherein the relational expression is a linear relational expression represented by the following relational expression (I):

$$y=ax+b \qquad (I)$$

wherein x is the total of the amount of water refluxed into distillation column and the amount of water discharged without being refluxed in the dehydration step, y is the amount of hydrogen sulfide discharged from the reaction vessel, and both a and b are parameters.

3. The production process according to claim 1, wherein in the dehydration step, the mixture is heated to a temperature of 100 to 250° C.

4. The production process according to claim 1, wherein in the dehydration step, the dehydration under heat is conducted in such a manner that the water content falls within a range of 0.3 to 5 mol per mol of the alkali metal sulfide (A) charged.

5. The production process according to claim 1, wherein in the dehydration step, the dehydration under heat is conducted by means of an apparatus so constructed that an upper part of the reaction vessel is connected to the distillation column, a fraction from the top of the distillation column is successively sent to a condenser and a storage tank, a fraction from the bottom of the distillation column is refluxed into the reaction vessel, a part of water stored in the storage tank is refluxed into the distillation column, and at that time an amount of water refluxed is integrated by a flowmeter.

6. The production process according to claim 1, wherein after the dehydration step, an amount of the dihalo-aromatic compound (B) charged is controlled within a range of 1.00 to 1.09 mol per mol of the sulfur source (A) charged.

7. The production process according to claim 1, wherein in the polymerization step, the polymerization reaction is conducted by an at least two-stage polymerization process comprising:
(1) Step 1 of heating a reaction mixture containing the organic amide solvent, the sulfur source (A) and the dihalo-aromatic compound (B) to 170 to 270° C. in the presence of water in an amount of 0.5 to 2.0 mol per mol of the sulfur source (A) charged to conduct a polymerization reaction, thereby forming a prepolymer wherein conversion of the dihalo-aromatic compound is 50 to 98%, and
(2) Step 2 of controlling the amount of water in the reaction system so as to bring about a state that water exists in a proportion of more than 2.0 mol, but up to 10 mol per mol of the sulfur source (A) charged, and heating the reaction system to 245 to 290° C., thereby continuing the polymerization reaction.

8. The production process according to claim 7, wherein in Step 1, a prepolymer having a melt viscosity of 0.5 to 30 Pa·s as measured at a temperature of 310° C. and a shear rate of 1,216 $sec^{-1}$ is formed.

* * * * *